United States Patent [19]

Asada

[11] Patent Number: 5,018,881
[45] Date of Patent: May 28, 1991

[54] SELF ACTING GAS BEARING APPARATUS

[75] Inventor: Takafumi Asada, Hirakata, Japan

[73] Assignee: Matsushita Electric Industrial Co., Ltd., Osaka, Japan

[21] Appl. No.: 424,493

[22] Filed: Oct. 20, 1989

[30] Foreign Application Priority Data
Oct. 20, 1988 [JP] Japan .................................. 63.264504

[51] Int. Cl.$^5$ .............................................. F16C 32/00
[52] U.S. Cl. .................................... 384/113; 384/100; 384/107; 384/473
[58] Field of Search ............... 384/113, 473, 107, 115, 384/120, 114, 100

[56] References Cited

U.S. PATENT DOCUMENTS

| 4,696,584 | 9/1987 | Tielemans | 384/113 |
| 4,772,136 | 9/1988 | Carter | 384/473 |
| 4,805,972 | 2/1989 | Tanaka et al. | 384/113 |

Primary Examiner—Lenard A. Footland
Attorney, Agent, or Firm—Panitch, Schwarze, Jacobs & Nadel

[57] ABSTRACT

A self acting gas bearing apparatus comprising a cantilevered shaft, a sleeve that is fitted to the shaft so as to be freely rotatable around the shaft, and a lid that is fixed onto one end of the sleeve, wherein one or more intake holes having filters thereon are provided on the sleeve or lid in the vicinity of the free end side of the shaft, and dynamic pressure generating grooves that force gas from the intake holes toward the fixed end side of the shaft are provided on the outer surface of the shaft or the inner surface of the sleeve, whereby fine particles are prevented from entering into a bearing clearance between the shaft and the sleeve, thereby ensuring a smooth rotation of the sleeve around the shaft without coming into contact with the shaft.

5 Claims, 2 Drawing Sheets

SELF ACTING GAS BEARING APPARATUS

BACKGROUND OF THE INVENTION

1. Field of the Invention

The present invention relates to a self acting gas bearing apparatus equipped with dynamic pressure generating grooves which is used in spindle sections of polygon mirror scanners, hard disk drive units and other devices.

2. Description of the Prior Art

Among the self acting gas bearing apparatuses of various constitutions proposed so far, an apparatus as shown in FIG. 5, has been known to be applied to a polygon mirror scanner. The conventional dynamic pressure gas bearing apparatus comprises a bearing body 22 with a shaft 23 fixed at the center thereof. Fitted to the shaft 23 is a sleeve 24 that is freely rotatable with a proper clearance therebetween. Formed on the outer surface of the shaft 23 are dynamic pressure generating grooves 23a and 23b of a herring-bone-like configuration and dynamic pressure generating grooves 23c of a helical configuration. Fixed on the bearing body 22 is a stator 25 of a motor 27, and fixed on the sleeve 24 is a rotor 26. Fixed on the top of the sleeve 24 is a thrust bearing member 28 which has a throttle hole 28a. Fixed on a flange section 24a of the sleeve 24 is a polygon mirror 29 via a set plate 30 by means of screws. A dust cover 31 and a polished glass 32 are provided for the purpose of preventing the entry of dust into the bearing clearance.

The self acting gas bearing apparatus of a constitution as described above, works as follows: First, when the motor 27 is energized and the rotor 26 starts to rotate, the sleeve 24 rotates without coming into contact with the shaft 23 by a pumping action of the dynamic pressure generating grooves 23a and 23b. When the motor 27 is at a stand-still, the shaft 23 and the thrust bearing member 28 are in contact with each other. However, once the sleeve 24 rotates, the pumping action of the helical-shaped dynamic pressure generating grooves 23c causes the gas around the bearing to be drawn in the direction indicated by arrows B and discharged through the throttle hole 28a in the direction indicated by arrow C, thereby generating a lifting force in the direction indicated by arrow A to lift the sleeve 24. Laser beam from a light source (not shown) outside of this self acting gas bearing transmits through the polished glass 32 in the direction indicated by arrow D and is reflected by the polygon mirror 29.

In such a constitution, however, while the gas around the bearing is drawn from the clearance between the sleeve 24 and the bearing body 22 in the direction indicated by the arrow B by the helical-shaped dynamic pressure generating grooves 23c of the shaft 23 during a rotation of the sleeve 24, fine particles of several micrometers from the surroundings, which are, for example, generated from the coil insulation film of the stator 25, enter the bearing clearance between the shaft 23 and the sleeve 24, eventually causing seizure of the bearing. The dust cover 31 which covers the entire surface of the unit and the polished glass 32 are needed, which makes the production cost high.

SUMMARY OF THE INVENTION

The self acting gas bearing apparatus of the present invention, which overcomes the above-discussed and numerous other disadvantages and deficiencies of the prior art, comprises a cantilevered shaft, a sleeve that is fitted to said shaft so as to be freely rotatable around said shaft, and a lid that is fixed onto one end of said sleeve, wherein one or more intake holes having filters thereon are provided on said sleeve or lid in the vicinity of the free end side of said shaft, and dynamic pressure generating grooves that force gas from said intake holes toward the fixed end side of said shaft are provided on the outer surface of said shaft or the inner surface of said sleeve.

Alternatively, the self acting gas bearing apparatus of the present invention comprises a cantilevered shaft, a sleeve that is fitted to said shaft so as to be freely rotatable around said shaft, and a lid that is fixed onto one end of said sleeve, wherein first dynamic pressure generating grooves that force gas toward the free end side of said shaft are provided in the vicinity of the free end side of said shaft on the outer surface of said shaft or the inner surface of said sleeve, second dynamic pressure generating grooves that force gas toward the fixed end side of said shaft are provided in the vicinity of the fixed end side of said shaft on the outer surface of said shaft or the inner surface of said sleeve, and one or more intake holes having filters thereon are provided in an intermediate section between said first and second dynamic pressure generating grooves, said lid or sleeve having one or more vent holes in the vicinity of the free end side of said shaft that is provided with said first dynamic pressure generating grooves.

Alternatively, the self acting gas bearing apparatus of the present invention comprises a cantilevered shaft, a sleeve that is fitted to said shaft so as to be freely rotatable around said shaft, and a lid that is fixed onto one end of said sleeve, wherein one or more intake holes having filters thereon are provided on said sleeve or lid, and dynamic pressure generating grooves that force gas from said intake holes toward the fixed end side of said shaft are provided on the outer surface of said shaft or the inner surface of said sleeve.

Thus, the invention described herein makes possible the objectives of (1) providing a self acting gas bearing apparatus that prevents fine particles from entering into a clearance between the shaft and the sleeve and from being burnt therein, thereby ensuring a smooth rotation of the sleeve around the shaft without coming into contact with the shaft; and (2) providing a self acting gas bearing apparatus that requires neither a dust cover nor a polished glass, which makes the production cost low and enables the size of the apparatus to be miniaturize.

BRIEF DESCRIPTION OF THE DRAWINGS

This invention may be better understood and its numerous objects and advantages will become apparent to those skilled in the art by reference to the accompanying drawings as follows.

DESCRIPTION OF THE PREFERRED EMBODIMENTS

Example 1

Figure 1:
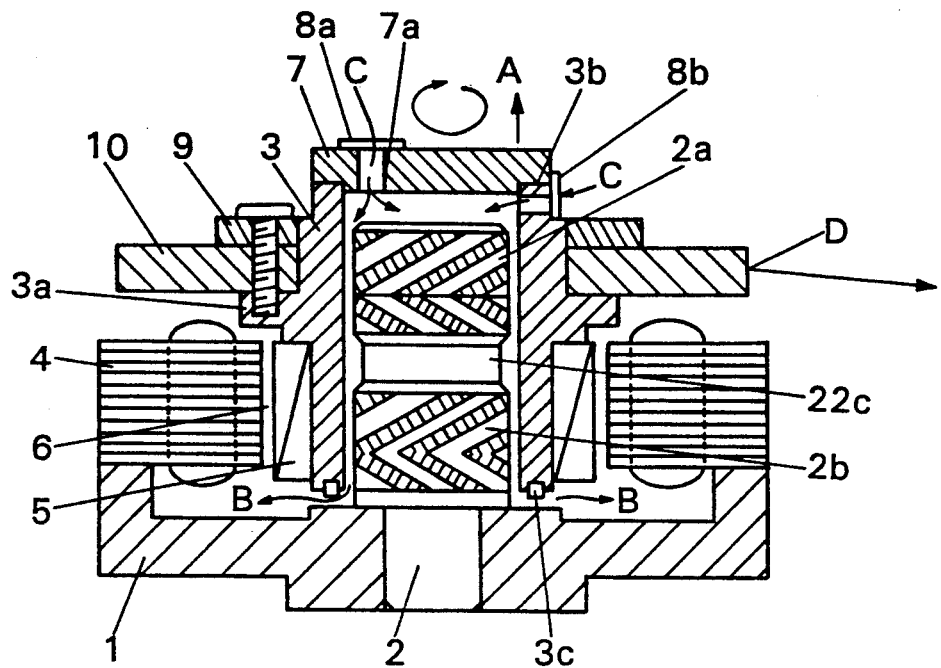
FIG. 1 is a cross sectional view showing a self acting gas bearing apparatus of this invention.

FIG. 1 shows a self acting gas bearing apparatus of the present invention, which comprises a disk-shaped bearing body 1 at the center of which the lower end of a shaft 2 is fixed. The cantilevered shaft 2 has on its outer surface two herringbone-configurated dynamic pressure generating grooves 2a and 2b, at least one of which is a herringbone groove of asymmetrical configuration, wherein the groove element on the free end side of the shaft 2 is made longer than the other element on the fixed end side of the shaft 2. The reference numeral 22c is a small diameter section that is an intermediate area of the surface of the shaft 2. Fitted to the shaft 2 is a sleeve 3 that is freely rotatable with a proper clearance therebetween. The sleeve 3 is provided with a lid 7 fixed at one end thereof. Provided on the lid 7 and the outer surface of the sleeve 3 in the vicinity of the free end of the shaft 2 are air intake holes 7a and 3b, respectively. Filters 8a and 8b are provided on the air intake holes 7a and 3c respectively. A cushion member 3d is fixed on either the sleeve 3 or the bearing body 1. On a flange section 3a of the sleeve 3 a polygon mirror 10 is fixed by means of a set plate 9 with screws or the like. A motor 6 is composed of a stator 4 and a rotor 5.

The self acting gas bearing apparatus constituted as described above works as follows: When the stator 4 of the motor 6 is energized, the rotor 5 rotates so as to cause the polygon mirror 10 to rotate together with the sleeve 3 at a high speed, for example, 30,000 rpm. When laser beam is incident upon the polygon mirror 10, it is reflected as indicated by arrow D by the polygon mirror 10. In this rotating status of the sleeve 3, gas pressure in the space between the dynamic pressure generating grooves 2a and 2b and the sleeve 3 is increased by a pumping action of the dynamic pressure generating grooves 2a and 2b, so that the sleeve 3 rotates at a high speed without coming into contact with the shaft 2. The rotor 5 which is a permanent magnet exerts magnetic levitation to the rotating unit in the direction A by attracting the stator 4 which is a ferromagnetic substance with a strong force. Consequently, the rotating unit remains to be lifted in the thrust direction either during rotation or when at a stand-still. While gas is introduced into the bearing clearance through the air intake holes 7a and 3b, it is cleaned by the filters 8a and 8b preventing dust around the bearing from entering thereinto. Should fine particles are generated by wear when starting and/or stopping, these particles are discharged in the direction B by their weight and the downward flow of the gas, because these particles have greater specific gravity than the gas. When a strong vibratory force is applied in the thrust direction of the bearing, the cushion member 3c absorbs the force to prevent damage on the bearing. The shaft 2 and the lid 7 are not in contact with each other.

As described above, according to this example, the dynamic pressure generating grooves 2a and 2b, which are provided on the outer surface of the shaft 2 or on the inner surface of the sleeve 3 and supplies the gas under pressure from the free end side of the shaft 2 to the fixed end side of the shaft 2, and the air intake holes 7a and 3b with filters 8a and 8b, which are provided on the sleeve 3 in the vicinity of the free end side of the shaft 2 or on the lid 7, prevent dust from entering into the clearance between the shaft 2 and the sleeve 3, thereby preventing the burning of dust on the bearing, which ensures a smooth rotation of the sleeve 3 around the shaft 2. Accordingly, a dust cover is not required.

Figure 2:
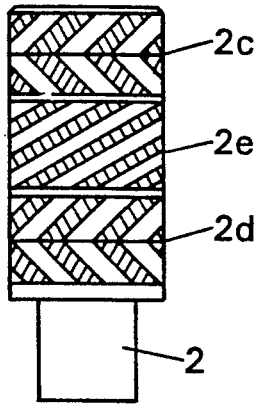
FIG. 2 is a front view showing a variation of the shaft shown in FIG. 1.

The dynamic pressure generating grooves 2a and 2b provided on the outer surface of the shaft 2 can be, of course, herringbone-shaped dynamic pressure generating grooves 2c and 2d and helical-shaped dynamic pressure generating groove 2e such as those shown in FIG. 2, which can also attain the same effects as those mentioned above. The dynamic pressure generating grooves 2a, 2b, 2c, 2d, and 2e can be provided on the inner surface of the sleeve 3.

Example 2

Figure 3:
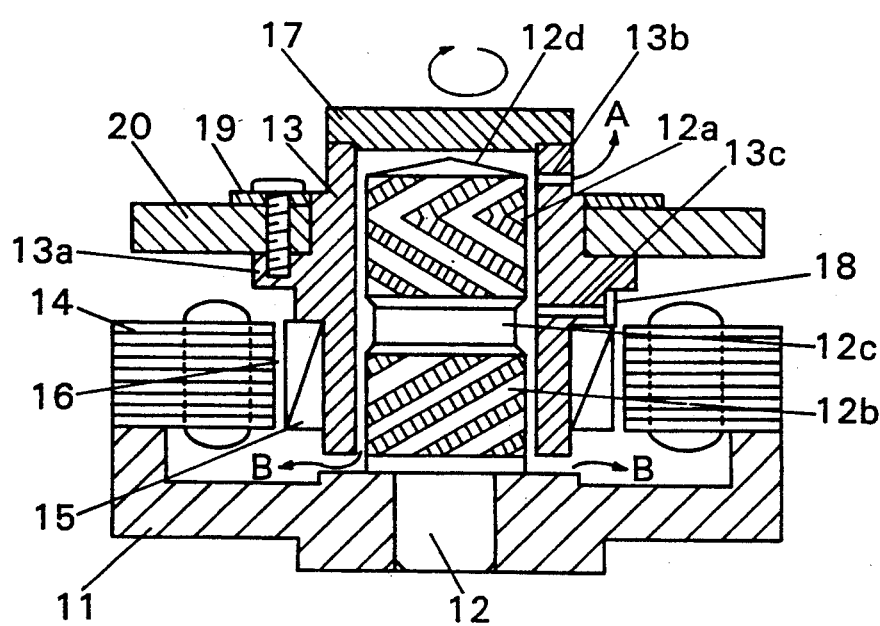
FIG. 3 is a cross sectional view showing another self acting gas bearing apparatus of this invention.

FIG. 3 shows another self acting gas bearing apparatus of the present invention, which comprises a disk-shaped bearing body 11 at the center of which the lower end of a shaft 12 is fixed. A sleeve 13 that is freely rotatable around the cantilevered shaft 12 is fitted to the shaft 12 with a space therebetween. The shaft 12 has on its outer surface a first dynamic pressure generating grooves 12a which deliver gas toward the free end side of the shaft 12 by means of a rotation of the sleeve 13 and a second dynamic pressure generating grooves 12b which deliver gas toward the fixed end side of the shaft 12 by means of a rotation of the sleeve 13. A conical projection 12d is provided at the tip of the shaft 12. The sleeve 13 is provided with a lid 17 fixed at one end thereof. Provided on the outer surface of the sleeve 13 in the vicinity of the free end of the shaft 12 are a plurality of vent holes 13b of a diameter about 0.8 mm. A plurality of air intake holes 13c of a diameter of about 1 to 2 mm are provided in the vicinity of a small diameter section 12c of the shaft 12. A filter 18 is provided on the air intake holes 13c. On a flange section 13a of the sleeve 13 a polygon mirror 20 is fixed by means of a set plate 19 with screws or the like. A stator 14 and a rotor 15 constitutes a motor 16.

The self acting gas bearing apparatus constituted as described above works as follows: In FIG. 3, when the stator 14 of the motor 16 is energized, the rotor 15 is driven to rotate causing the polygon mirror 20 to rotate together with the sleeve 13 at a high speed, for example, 30,000 rpm. In this rotating status of the sleeve 13, gas pressure in a space between the dynamic pressure generating grooves 12a and 12b and the sleeve 13 is increased by a pumping action of the first and second dynamic pressure generating grooves 12a and 12b, so that the sleeve 13 rotates at a high speed without coming into contact with other members. During a rotation of the sleeve 13, the gas enters into the bearing clearance through the air intake holes 13c with the filter 18 by which dust floating around the bearing apparatus is removed from the gas. By this way, dust is prevented from entering into the bearing clearance. The first individual dynamic pressure generating grooves 12a, which are a herringbone groove of asymmetric configuration where the lower side element of the groove is made longer than the upper side element of the groove, deliver the gas under pressure toward the free end side of the shaft 12 (upward). Therefore, gas pressure in the space between the shaft 12 and the lid 17 is increased, thereby causing the rotating unit to be lifted and rotated without coming into contact with other members. When the rotating unit is lifted beyond a certain level, an amount of pressurized gas is discharged through the vent holes 13b in the direction indicated by arrow A, thereby maintaining a constant lift which is determined by the position, diameter, and other factors of the vent holes 13b. Because the gas is discharged through the vent holes 13b in the direction indicated by arrow A, dust around the bearing apparatus does not enter thereinto, but rather particles, if ever generated by wear within the bearing apparatus, are discharged out of the bearing apparatus to clean the inside of the bearing apparatus. On the other hand, the second dynamic pressure generating grooves 12b, which are helical grooves, cause the gas pressure to increase together with the rotation of sleeve 13 and deliver the gas under pressure downward and discharges it in the direction indicated by arrow B. Thus, the entry of dust from the surroundings into the bearing clearance is prevented.

As mentioned above, according to this example, the bearing apparatus has the first dynamic pressure generating grooves 12a which force the gas to the free end side of the shaft 12, the second dynamic pressure generating grooves 12b which force the gas to the fixed end side of the shaft 12, the air intake holes with a filter which are provided between these two dynamic pressure generating grooves, and the vent holes which are provided at the free end side of the shaft 12 in the vicinity of which the first dynamic pressure generating grooves 12a are provided, so that the entry of dust into the bearing clearance can be prevented and the burning of dust within the bearing apparatus can be prevented, thereby ensuring a smooth rotation of the sleeve 13 around the shaft 12. Accordingly, a dust cover that covers the bearing apparatus is not required, which makes the production cost of the bearing apparatus low. Moreover, the bearing apparatus can be miniaturized.

Figure 4:
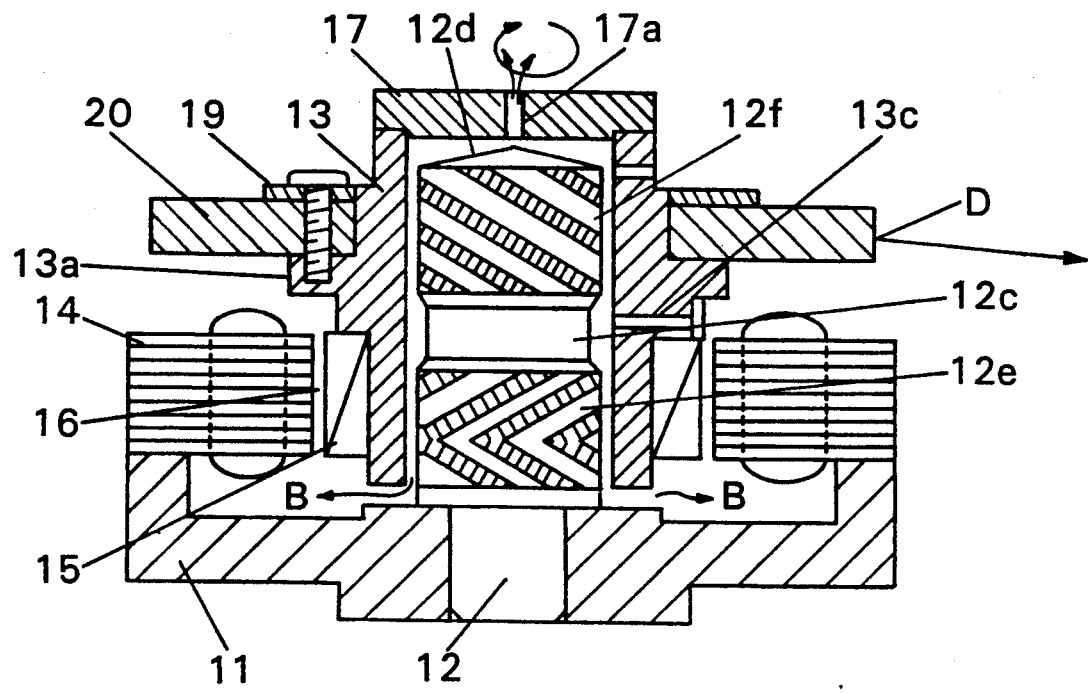
FIG. 4 is a cross sectional view showing a variation of the apparatus shown in FIG. 3.
Figure 5:
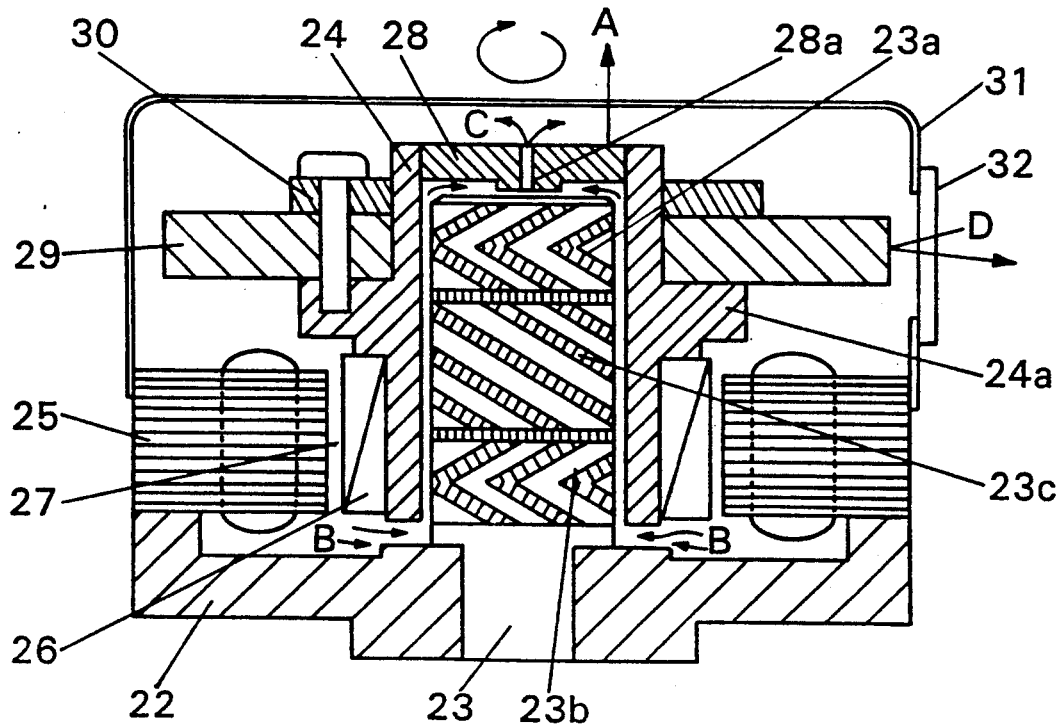
FIG. 5 is a cross sectional view showing a conventional self acting gas bearing apparatus.

The first dynamic pressure generating grooves 12a of the shaft 12 in FIG. 3 can be either helical grooves such as those 12f of FIG. 4 or herring-bone-shaped pressure generating grooves of an asymmetric configuration such as those 12e of FIG. 4 wherein the upper side element of each groove is made longer than the lower side element of the groove for the purpose of forcing the gas downward. The dynamic pressure generating grooves can be provided on the inner surface of the sleeve for the same effects as those described above.

Instead of the vent holes 13b of Example 2, as shown in FIG. 4, a vent hole 17a can be provided on a portion of the lid 17 that faces the tip of the shaft 12.

It is understood that various other modifications will be apparent to and can be readily made by those skilled in the art without departing from the scope and spirit of this invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art to which this invention pertains.

What is claimed is:

1. A self acting gas bearing apparatus comprising a cantilevered shaft, a sleeve member that is fitted to said shaft so as to be freely rotatable around said shaft, and a lid member that is fixed onto one end of said sleeve, wherein one or more intake holes having filters thereon are provided on one of said members in the vicinity of the free end side of said shaft, and dynamic pressure generating grooves that force gas from said intake holes toward the fixed end side of said shaft are provided on the outer surface of said shaft.

2. A self acting gas bearing apparatus comprising a cantilevered shaft, a sleeve member that is fitted to said shaft so as to be freely rotatable around said shaft, and a lid member that is fixed onto one end of said sleeve, wherein first dynamic pressure generating grooves that force gas toward the free end side of said shaft are provided in the vicinity of the free end side of said shaft on the outer surface of said shaft, second dynamic pressure generating grooves that force gas toward the fixed end side of said shaft are provided in the vicinity of the fixed end side of said shaft on the outer surface of said shaft, and one or more intake holes having filters thereon are provided in an intermediate section between said first and second dynamic pressure generating grooves, one of said members having one or more vent holes in the vicinity of the free end side of said shaft that is provided with said first dynamic pressure generating grooves.

3. A self acting gas bearing apparatus comprising a cantilevered shaft, a sleeve that is fitted to said shaft so as to be freely rotatable around said shaft, and a lid that is fixed onto one end of said sleeve, wherein one or more intake holes having filters thereon are provided on said sleeve or lid, and dynamic pressure generating grooves that force gas from said intake holes toward the fixed end side of said shaft are provided on the outer surface of said shaft or the inner surface of said sleeve.

4. A self acting gas bearing apparatus comprising a cantilevered shaft, a sleeve member that is fitted to said shaft so as to be freely rotatable around said shaft, and a lid member that is fixed onto one end of said sleeve, wherein one or more intake holes having filters thereon are provided on one of said members in the vicinity of the free end side of said shaft, and dynamic pressure generating grooves that force gas from said intake holes toward the fixed end side of said shaft are provided on the inner surface of said sleeve.

5. A self acting gas bearing apparatus comprising a cantilevered shaft, a sleeve member that is fitted to said shaft so as to be freely rotatable around said shaft, and a lid member that is fixed onto one end of said sleeve, wherein first dynamic pressure generating grooves that force gas toward the free end side of said shaft are provided in the vicinity of the free end side of said shaft on the inner surface of said sleeve, second dynamic pressure generating grooves that force gas toward the fixed end side of said shaft are provided in the vicinity of the fixed end side of said shaft on the inner surface of said sleeve, and one or more intake holes having filters thereon are provided in an intermediate section between said first and second dynamic pressure generating grooves, one of said members having one or more vent holes in the vicinity of the free end side of said shaft that is provided with said first dynamic pressure generating grooves.

* * * * *